(12) United States Patent
Nyström et al.

(10) Patent No.: US 7,881,260 B2
(45) Date of Patent: Feb. 1, 2011

(54) METHOD AND APPARATUS IN A CELLULAR TELECOMMUNICATIONS SYSTEM

(75) Inventors: Johan Nyström, Stockholm (SE);
Göran Klang, Enskede (SE); Pal Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 892 days.

(21) Appl. No.: 10/582,688

(22) PCT Filed: Dec. 19, 2003

(86) PCT No.: PCT/SE03/02029

§ 371 (c)(1), (2), (4) Date: Apr. 12, 2007

(87) PCT Pub. No.: WO2005/060195

PCT Pub. Date: Jun. 30, 2005

(65) Prior Publication Data

US 2008/0045225 A1   Feb. 21, 2008

(51) Int. Cl.
*H04J 11/00* (2006.01)
*H04W 72/00* (2009.01)

(52) U.S. Cl. .................. 370/330; 370/210; 455/450
(58) Field of Classification Search ........... 375/130; 370/208; 455/450
See application file for complete search history.

(56) References Cited

U.S. PATENT DOCUMENTS 5,726,978 A * 3/1998 Frodigh et al. ............ 370/252
5,907,577 A * 5/1999 Hoole ........................ 375/130
6,404,783 B1   6/2002 Cimini, Jr. et al.
6,430,148 B1   8/2002 Ring
2002/0097791 A1   7/2002 Hansen

FOREIGN PATENT DOCUMENTS

| CN | 1187930 | 7/1998 |
|---|---|---|
| CN | 1187930 A | 7/1998 |
| EP | 0 760 564 | 2/2004 |

(Continued)

OTHER PUBLICATIONS

CN Office Action mailed Mar. 20, 2009 in corresponding CN application 200380111048.X.

(Continued)

*Primary Examiner*—George Eng
*Assistant Examiner*—Nizar Sivji
(74) *Attorney, Agent, or Firm*—Nixon & Vanderhye P.C.

(57) ABSTRACT

A method for use in a cellular, FFT based multi-carrier communications system comprising N subcarriers, for allocating a set P of sub-carriers to be reserved for potential use as carriers of specific information. A number M indicating the number of sub-carriers to be allocated to a set P of sub-carriers, such that L=N/M is an integer. At least two subcarriers of the set $P=\{(n_0+m*L) \bmod N : 0 \leq m < M\}$ for the specific information, $n_0$ being the offset of the lowest numbered subcarrier in P, the elements of P being indices, each referring to the number of a sub-carrier to be allocated. An apparatus for carrying out the method is also disclosed. The sub-channels are maximally spread in frequency, which gives maximum diversity and also enables the use of low-complexity terminals.

11 Claims, 3 Drawing Sheets

FOREIGN PATENT DOCUMENTS

| | | |
|---|---|---|
| JP | 11-113049 A | 4/2004 |
| WO | 97/01256 A1 | 1/1997 |
| WO | WO 97/01256 | 1/1997 |

OTHER PUBLICATIONS

Kivanc et al., *Subcarrier Allocation and Power Control for OFDMA*, Signals Systems and Computers, 2000, Conference Record of the Thirty-Fourth Asilomar Conference on Oct. 29-Nov. 1, 2000, pp. 147-151.

Summary of JP Office Action dated Jun. 8, 2009 in corresponding JP Application No. 2005-512229.

Translation of Chinese official action, May 12, 2010 in corresponding Chinese Application No. 200380111048.X.

* cited by examiner

METHOD AND APPARATUS IN A CELLULAR TELECOMMUNICATIONS SYSTEM

This application is the US national phase of international application PCT/SE2003/002029 filed 19 Dec. 2003, which designated the U.S., the entire contents of which are hereby incorporated by reference.

TECHNICAL FIELD

The present invention relates to a method as defined in the preamble of claim 1 and a signal transmitting node as defined in the preamble of claim 9.

BACKGROUND

Multi carrier methods are used both in wired and wireless communication systems. Examples for wired systems are ADSL (Asymmetric Digital Subscriber Line), VDSL (Very high rate Digital Subscriber Line), or more generally xDSL. Examples of wireless multi-carrier systems are IEEE 802.11a, IEEE 802.11g och Hyperlan II, which are all based on OFDM (Orthogonal Frequency Division Multiplex) technology.

Typically a multi carrier system sends coded information from a sender to a receiver on a set of N carriers (sometimes also called sub-carriers), where N is an integer, typically in the interval 64-4096, depending on the system.

Since the radio spectrum suitable for wireless communication is a limited and shared resource, the spectrum assigned to any given system intended to serve multiple users distributed over a possibly large service area must be reused in different sub-areas, or cells, of the total service area, in order to provide sufficient coverage and capacity. Depending on the multiple access technique used, the distance between different cells, or base stations, assigned to the same portion of the available spectrum may vary. In order for a mobile station in an arbitrary location in the service area to determine which cell or which base station to connect to, the base stations must transmit information that can be used by the mobile stations to identify the different base stations that are in range of the mobile station.

In multi-carrier systems the available bandwidth is divided into a number of sub-channels. These subchannels can be used for carrying different types of payload and/or control information. For example, in the base stations of cellular networks, one or more of the available sub-channels can be reserved for cell-specific broadcast information, which will enable the mobile stations both to detect the presence of and to synchronize to different base stations in order to retrieve cell-specific information. Similar to conventional frequency reuse, the sub-channels reserved for this purpose can be reused in different cells that are sufficiently far away from each other propagation wise.

To perform cell search and retrieve cell-specific information, at least to some extent, the set of physical resources allocated for this purpose should be known by the mobile stations in advance. In addition, to support mobile stations belonging to different generations, this minimum allocation should be static during the entire lifetime of the network. Hence, the allocation strategy for sub-channels conveying cell-specific transmissions is of fundamental importance when designing a system.

In multi-carrier systems with many sub-channels, clearly many different allocation strategies can be formed to define an aggregate physical information channel. However, a good strategy should take into account diversity and receiver complexity:

Diversity. In case of channel delay spread, the frequency response of the overall channel will not be flat. Thus, the different sub-channels will face different attenuation and phase shifts. Hence, in order for the mobile stations to be able to detect and synchronize even in the case of frequency selective fading, multiple sub-bands that are sufficiently spaced in frequency to minimize the risk of contemporaneous bad transmission conditions should be allocated.

Receiver complexity. When mobile stations are not active, that is, not conducting traffic, they will sleep in order to conserve battery power. However, to maintain synchronization to the serving base station and check for new base stations potentially offering a better connection, the mobile stations must periodically "wake up" and perform measurements. Thus, to help the mobile stations to preserve battery capacity, a good allocation strategy should support low-complexity implementations for detecting the sub-channels that carry cell-specific information.

OBJECT

Thus, it is an object to provide an efficient allocation strategy for aggregate physical information channels providing high diversity for sub-channels to be used as carriers in a multicarrier system.

SUMMARY

The object is achieved by a method for use in a cellular, FFT based multi-carrier communications system comprising N subcarriers, for allocating a set P of subcarriers to be reserved for potential use as carriers of specific information, comprising the following steps:

selecting a number M indicating the number of sub-carriers to be allocated to a set P of sub-carriers, such that L=N/M is an integer allocating at least two subcarriers of the set $P=\{(n_0+m*L) \mod N: 0 \leq m < M\}$ for the specific information, $n_0$ being the offset of the lowest numbered subcarrier in P.

The elements of P are indices, each referring to the number of a sub-carrier to be allocated.

The object is also achieved by a signal transmitting node for use in a cellular, FFT-based multi-carrier communications system comprising N sub-carriers, comprising means for selecting a number M indicating the number of sub-carriers to be allocated to a set P of sub-carriers, such that L=N/M is an integer allocating the at least two subcarriers of the set $P=\{(n_0+m*L) \mod N: 0<m<M\}$ for the specific information, no being the offset of the lowest numbered subcarrier in P.

IFFT means for performing an IFFT on at least the subcarriers of the set P to produce an output block;

Transmitting means for transmitting the output block in its serial form.

The sub-channels are maximally spread in frequency, which gives diversity, thus reducing the impact of fading.

The method also enables the use of low-complexity terminals which may be designed to be energy economic. The user terminal described in co-pending EP application No. 03104851-5 entitled "Signal Conversion" (withdrawn before publication), filed by the same applicant and on the same day as this application is particularly advantageous together with the present invention. Briefly, according to the co-pending application, the transmitter performs a signal conversion of a block of N received signal samples to convert it into a new block of M signal samples, where M is an integer between 2 and N that divides N. An advantage of this conversion is that subsequent Fourier transformation may be performed by an M-point FFT (Fast Fourier Transform) instead of an N-point FFT as in existing systems, M being significantly smaller than N. This feature is especially attractive in mobile stations, where the reduced complexity results in longer battery times.

The method may be used for any type of information that is transmitted in the system. This includes payload data as well as both common and cell-specific broadcast data.

In a preferred embodiment the specific information is payload data. By enabling the transmission of payload data on a well-defined set of carriers equally spaced from each other in the inventive way, terminals of lower complexity can be used. More specifically, terminals that are only able to receive a limited data rate can be allowed in the system. This enables subscribers in the system to select different levels of service in dependence of their requirements on the system. For example, a user who is only interested in low data rate connections can use a simpler terminal and a cheaper type of subscription than a user who requires high-capacity data connections.

Alternatively, the specific information is common broadcast information that is simultaneously transmitted from two or more base stations in the service area. Alternatively, the specific information is cell-specific information, such as synchronization information transmitted in synchronization channels, information about cell identity, cell configuration, or load indication.

In mobile terminals, synchronization signals from at least one base station are periodically received and evaluated also when the system is idle. Therefore, reducing the complexity of these calculations will lead to longer battery times.

The technology also enables the use of low-complexity base stations, for example for relaying a limited amount of information from a full-scale base station to a mobile terminal.

The technology can also be used for communication directly between two mobile terminals. The transmitting terminal then performs the method. Both the transmitting and the receiving terminal can be of a simplified construction, for example, according to the above mentioned co-pending application.

According to a preferred embodiment at least one subset $P_i$ of P is defined such that $P_i \subseteq P$ and $P_i = \{(n_0' + m'*L') \mod N\}$, where $L' > L$ and L divides $L'$. If more than one subset is defined, the subsets must be orthogonal and defined such that $\{P_0 \cup \ldots \cup P_{K-1}\} \subseteq P$ and $\{P_i \cap P_j\} = \emptyset$, for all $i \neq j$.

In this way, different subsets of P can be assigned to different cells in a reuse cluster. Hence, the subsets of P can be reused in different cells at the greatest possible distance from each other in order to reduce the impact of co-channel interference. Due to its inherent structure, each subset can be detected and/or power estimated with the low complexity method described the above-mentioned co-pending application. In this way frequency reuse larger than one is supported.

In this embodiment a mobile terminal in idle mode can choose to only communicate with and evaluate the signals received from one particular base station, typically the one from which the strongest signal is received, thus further reducing the complexity of the calculations. When the power received from the current base station drops, the terminal can again evaluate all synchronization signals, i.e. all sub-carriers in the set P and select another base station with which to communicate.

A hierarchy of subsets can be defined, where P is the first level. On the second level, a number K of subsets $P_k$ of P are defined, where the channels within each subset $P_k$ are separated by the same distance. Subsets of each subset $P_k$ may be defined, for example, to identify different sectors in a cell.

Some of the channels allocated, or reserved, may not be used, typically the channels at either end of the frequency range. Still, the entire frequency range should be considered when defining N.

Throughout this document, the subcarriers are numbered from 0 to N−1. The subcarriers and sets of subcarriers are thus represented by a set of indices between 0 and N−1. The relationship between subcarriers is easily described using this convention. Other numbering conventions might be used.

DETAILED DESCRIPTION

Figure 1:
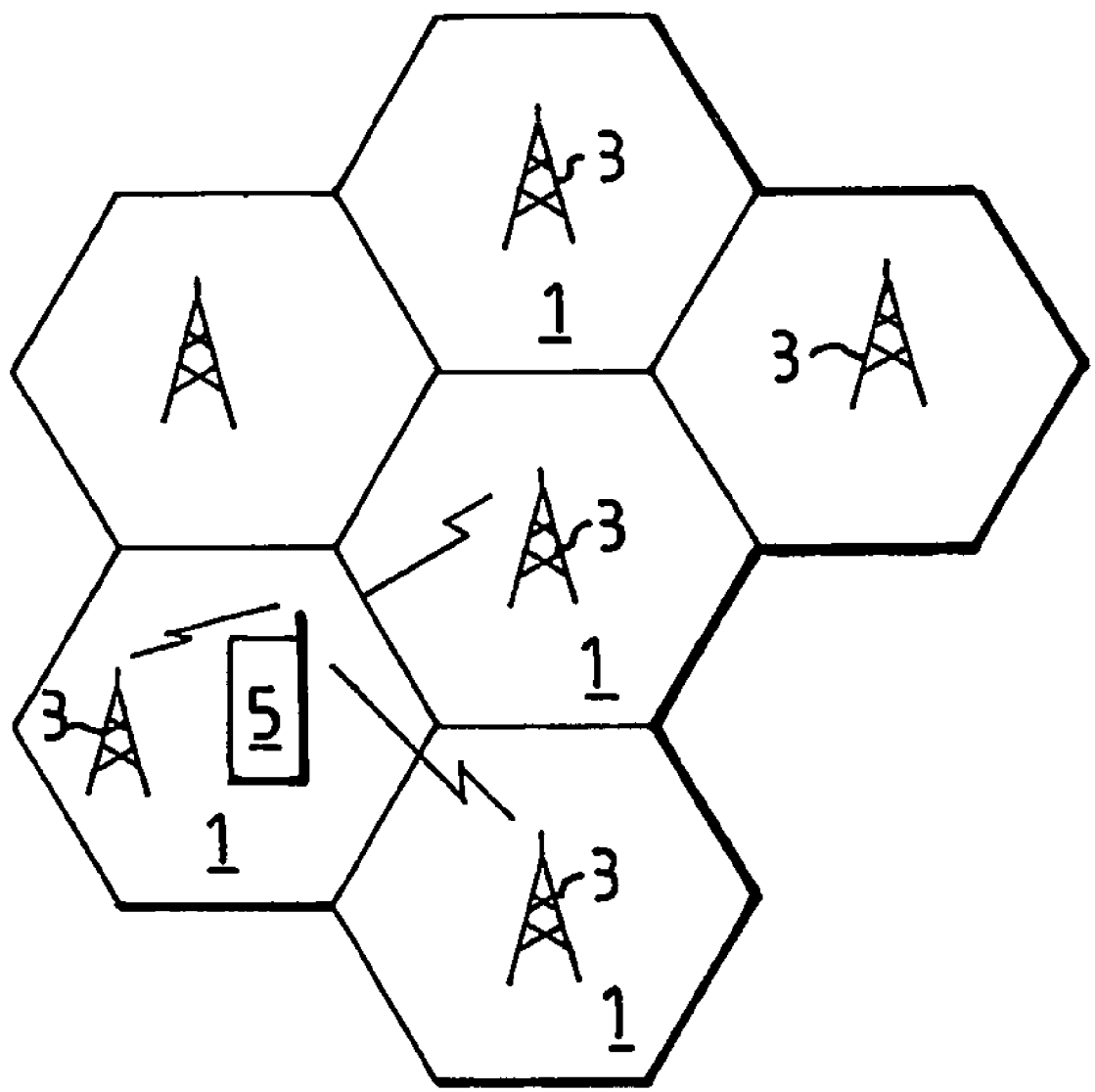
FIG. 1 illustrates schematically a cellular system.

An application is illustrated in FIG. 1, which shows, schematically, a cellular system comprising a number of cells. In each cell a base station is located for communication with mobile terminals located within the cell. Each base station transmits synchronization channels for synchronization of the mobile terminals within its cell. A mobile terminal located in a particular cell will be able to receive synchronization channels from a number of base stations in adjacent cells.

Figure 2:
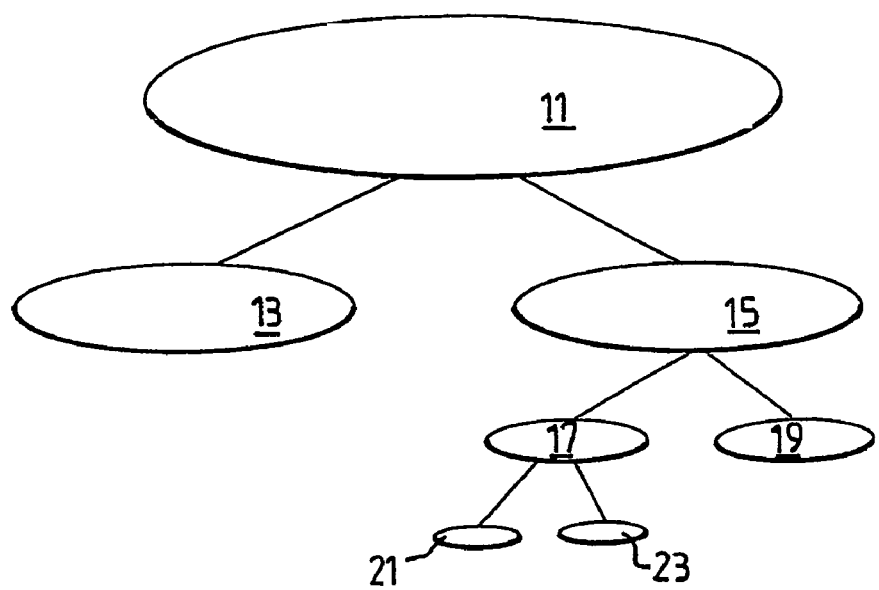
FIG. 2 illustrates the arrangement of different types of channels in a multi-carrier system.

FIG. 2 illustrates the arrangement of different types of channels in a multi-carrier system. On the uppermost level there is a broadband physical resource, comprising the entire bandwidth in the system. This bandwidth is divided into resources for payload data and resources for broadcast information. If the system is cellular, the resources for broadcast information are in turn divided into resources for common information (if applicable) and resources for cell-specific information, i.e. information that is the same in the whole system.

Figure 3:
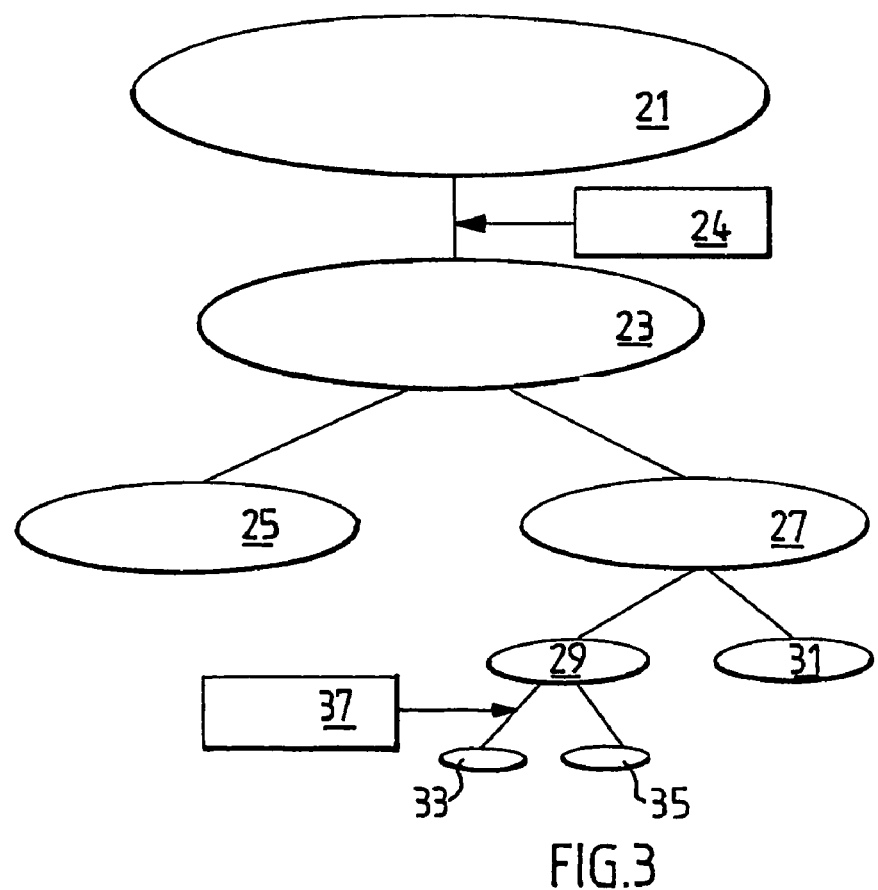
FIG. 3 illustrates the arrangement of different types of channels in an inventive multi-carrier system.

FIG. 3 illustrates the arrangement of different types of channels in another preferred multi-carrier system. As in FIG. 2, the uppermost level 21 is a broadband physical resource, comprising the entire bandwidth in the system. A lower-rate physical resource is selected as a set of resources within the broadband physical resource. A comb decomposition unit 24 is used to perform the selection of the set of resources. This lower-rate physical resource can in turn be divided into resources for payload data 25 and resources for broadcast information 27. If the system is cellular, the resources for broadcast information can be divided into resources for cell-specific information 29 and resources for common information 31, i.e., information that is the same in the whole system.

The comb decomposition 24 unit selects the set of resources by first selecting a number M of sub-carriers to be reserved, such that $L=N/M$ is an integer and then allocating the set P of subcarriers $P=\{n_0+mL:m=0, 1,\ldots,M-1\}$ for the specific information, which may be payload or broadcast information as described above. $n_o$ is the offset of the lowest numbered subcarrier in P. Not all the subcarriers in P have to be used for the specific information. One or more of the subcarriers can be used for other information, as long as at least two subcarriers are used. An alternative way of expressing P in this case becomes P ={(n$_0$+m*L) mod N: 0≦m<M}.

Figure 4:
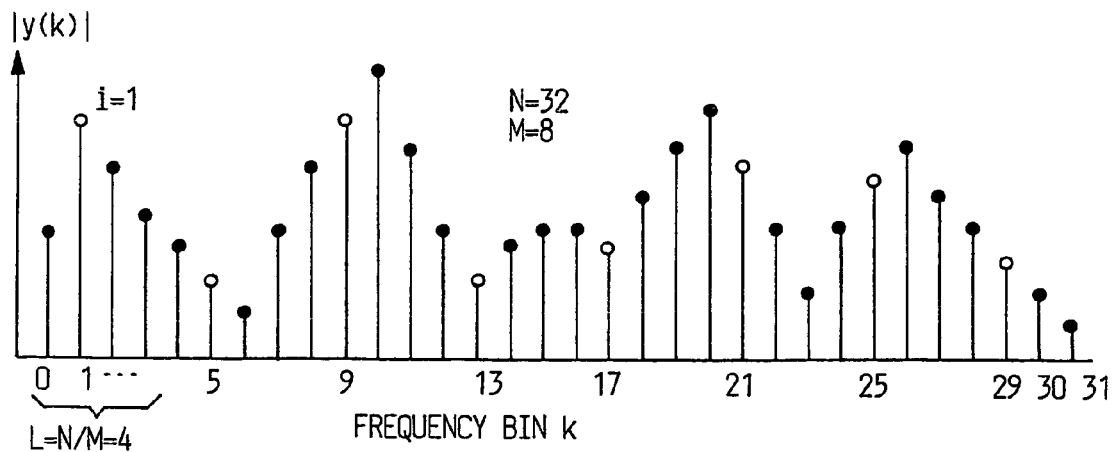
FIG. 4 is a discrete Fourier transform spectrum of a digital signal.

The technology makes use of a situation as illustrated by the simplified example spectrum in FIG. 4 (only the absolute values of the frequency components are shown, however, in practice they may be complex). In order to keep the size of the example manageable it is assumed that N=32 and M=8. In a communications system, of course, the values of N and M will be much higher. Thus, every fourth sub-carrier is included in the set P. The frequency bins of interest are indicated by circles instead of dots. In this example, sub-carriers i=1, 5, 9, 13, 17, 21, 25 and 29 are included in P, and are to be transmitted. An important feature of these frequency bins is that they are evenly distributed over the available frequency range. The frequency separation is L=N/M, which in this example equals 4. The distribution of the M frequency bins of interest is also characterized by a start position i between 0 and L, which in the example is equal to 1.

According to an example embodiment, the sub-carriers comprised in P can be further divided into subsets P$_k$. The distance between the sub-carriers within a subset should be the same in each subset. For example, four subsets P$_0$, P$_1$, P$_2$, P$_3$ may be defined according to the following:

P$_0$: subcarriers 1 and 17
P$_1$: subcarriers 5 and 21
P$_2$: subcarriers 9 and 25
P$_3$: subcarriers 13 and 29

As can be seen, the sub-carriers within each subset Pk are also located at the same distance from each other.

In this example, if each of the base stations of FIG. 1 uses a different subset P$_k$ of subcarriers for the synchronization signals the mobile terminal can select the synchronization signal from the appropriate base station and disregard the others. In this case, M is reduced to 2 and the spacing L=16.

If more than one channel is used to carry cell-specific information, these channels are arranged within the frequency range according to the following:

Assuming that the multi-carrier system has N sub-carriers, a set of M sub-carriers is reserved for potential use as carriers of cell-specific information in different cells. An offset n$_0$ is defined, which effectively identifies the first channel in the set of reserved sub-carriers. The reserved channels are placed at equal distance from each other, the distance being L=N/M.

Thus, the M sub-carriers are selected so that they are spaced L sub-carriers apart and belong to the set P={(n$_0$+m*L) mod N:m=0, 1,...,M−1}. The number M of sub-carriers reserved for the specific information and the carrier spacing L relate to the total number N of carriers as M*L=N. All subcarriers in the set P do not necessarily carry specific information but they may do so.

Assuming that there are N=32 sub-carriers, numbered 0, . . . ,31, and that M=8 subcarriers have been reserved for potential use as carriers of cell-specific information in different cells. If n0=1, that is, sub-carrier number 1 is selected as the first reserved sub-carrier, then the set of reserved subcarriers becomes P={1, 5, 9, 13, 17, 21, 25, 29}.

A subset of P may be selected, for example, P'{5, 9, 13, 17, 21, 25, 29}

Assuming that the number of subsets K=4 makes J=8/4=2. Then the set of reserved sub-carriers P={1, 5, 9, 13, 17, 21, 25, 29} can be divided into four disjoint subsets P0={1, 17}, P1={5, 21}, P2={9, 25} and P3={13, 29}. Each subset has the form {a+b*L*K} for an arbitrary offset a and for b=0, . . . ,J−1.

Figure 5:
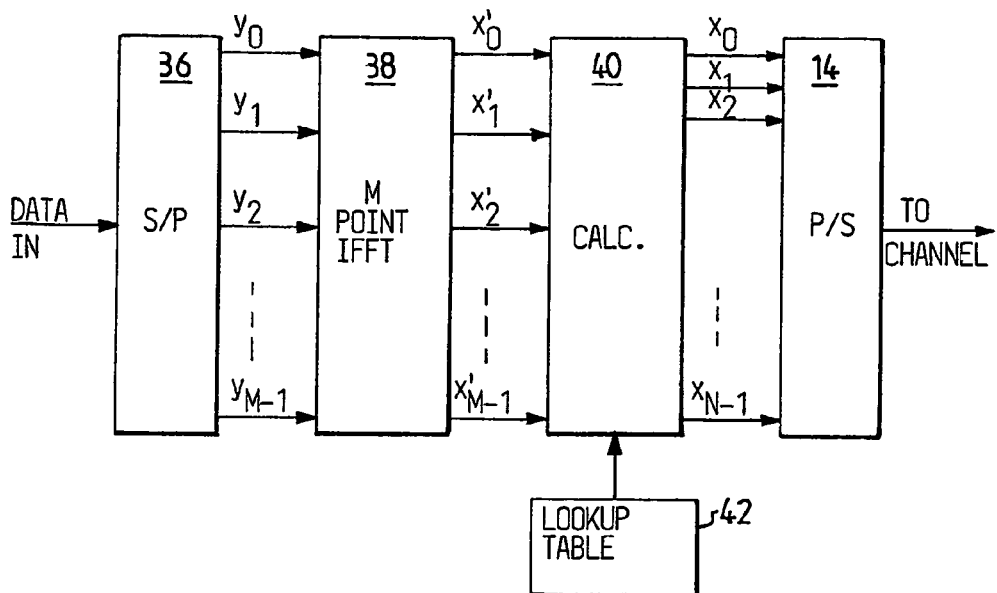
FIG. 5 is a schematic drawing of a transmitter that may be used.

FIG. 5 is block diagram of an exemplary embodiment of a transmitting end signal conversion apparatus This apparatus may, for example, be implemented in a mobile station of a multi-carrier communication system. However, in order to simplify the description, only elements necessary to explain are shown in the figure. The samples to be sent over the channel are received in a serial/parallel converter 36 from an information source unit not shown in FIG. 5. The samples are buffered in serial/parallel converter 36, which serial/parallel converts M samples. The M samples are forwarded from the serial/parallel converter 36 to an M-point IFFT transformer 38. The resulting block of M samples x'(m) is forwarded to a calculating unit 40, which performs the transformation from x'(m) to x(n) in accordance with equation (4). Preferably the rotators are obtained from a lookup table 42. The output signals from calculating unit 40 are forwarded to parallel/serial converter 14, which transforms them into serial form for output to the channel. The operations performed in the IFFT transformer 38 and the calculating unit 40, using information from the lookup table 42, map the information onto the appropriate subcarriers, that is, subcarriers belonging to the set P, or subset P$_k$, respectively, as defined above.

The invention claimed is:

1. A method for use in a cellular, FFT based multi-carrier communications system comprising N sub-carriers, for allocating a set P of sub-carriers to be reserved for potential use as carriers of specific information from a base station to a mobile terminal, comprising the following steps:
    selecting a number M indicating the number of sub-carriers to be allocated to a set P equi-spaced sub-carriers, such that L=N/M is an integer, where P={(n$_0$+m*L) mod N : 0≦m<M}, n$_0$ being the offset of the lowest numbered subcarrier in P, and
    allocating at least two subcarriers of the set P as subcarriers of cell-specific broadcast information,
    the method further comprising selecting at least one subset P$_i$ of the set P defined such that P$_i$ ⊂ P and P$_i$={(n$_0$'+m'*L') mod N}, where L'>L and L divides L'.

2. A method according to claim 1, comprising the step of selecting a first offset n$_0$<N and determining the subcarriers to be part of P on the basis of the first offset n$_0$.

3. A method according to claim 1, comprising the step of selecting a first offset n$_0$<L and determining the subcarriers to be part of P on the basis of the first offset n$_0$.

4. A method according to claim 1, wherein the specific information includes payload data.

5. A method according to claim 1, wherein the specific information is common broadcast information that is simultaneously transmitted from two or more base stations in the service are.

6. A signal transmitting node for use in a cellular, FFT-based multi-carrier communications system comprising N sub-carriers, for controlling transmission of information from a base station to a mobile terminal, said node comprising:
    means for selecting a number M indicating the number of sub-carriers to be allocated to a set P of sub-carriers, such that L=N/M is an integer, where P={(n$_0$+m*L) mod N : 0≦m<M}, n$_0$ being the offset of the lowest numbered subcarrier in P,
    means for allocating at least two subcarriers of the set P as carriers of cell-specific broadcast information, and
    IFFT means for performing an IFFT on at least the subcarriers of the set P to produce an output block;
    transmitting means for transmitting the output block in its serial form,
    further comprising means for selecting at least one subset P$_i$ of the set P defined such that P$_i$ ⊂ P and P$_i$={(n$_0$'+m'*L') mod N}, where L'>L and L divides L'and allocating at least two subcarriers in P$_i$ for cell- specific information.

7. A signal transmitting node according to claim 6, wherein the means for allocating is arranged to allocate subcarriers that hold payload information.

8. A signal transmitting node according to claim 6, wherein the means for allocating the at least two subcarriers of the set P is arranged to allocate subcarriers that hold common broadcast information that is simultaneously transmitted from two or more base stations in the service are.

9. A signal transmitting node for use in a cellular, FFT-based multi-carrier communications system comprising N sub-carriers, for controlling transmission of information from a base station to a mobile terminal, said node comprising electronic circuitry configured to:

select a number M indicating a number of equi-spaced sub-carriers to be allocated to a set P of sub-carriers, such that L=N/M is an integer, where P={$(n_0+m*L)$ mod N : $0 \leq m < M$}, $n_0$ being the offset of the lowest numbered subcarrier in P, allocate at least two subcarriers of the set P as subcarriers of cell-specific broadcast information, and perform a Fourier transform operation on at least the sub-carriers of the set P to produce an output block for transmission, wherein the electric circuitry is configured to select at least one subset $P_i$ of the set P defined such that $P_i \subset P$ and $P_i$={$(n_0'+m'*L')$ mod N}, where L'>L and to allocate at least two subcarriers in $P_i$ for cell-specific information.

10. A signal transmitting node according to claim 9, wherein the electronic circuitry is configured of the set P to allocate subcarriers that hold payload information.

11. A signal transmitting node according to claim 9, wherein the electronic circuitry is configured of the set P to allocate subcarriers of the set P that hold common broadcast information that is simultaneously transmitted from two or more base stations in a service area.

* * * * *

UNITED STATES PATENT AND TRADEMARK OFFICE
CERTIFICATE OF CORRECTION

PATENT NO. : 7,881,260 B2
APPLICATION NO. : 10/582688
DATED : February 1, 2011
INVENTOR(S) : Nystrom et al.

It is certified that error appears in the above-identified patent and that said Letters Patent is hereby corrected as shown below:

On the Title Pg, Item (75), under "Inventors", Line 2, delete "Pal" and insert -- Pål --, therefor.

On the Title Pg, Item (57), under "ABSTRACT", Line 7, delete "N : $0 \leq m < N$}" and insert -- N: $0 \leq m < M$} are allocated --, therefor.

In Column 5, Line 28, delete "Pk" and insert -- $P_k$ --, therefor.

In Column 5, Line 54, delete "If n0=1," and insert -- If $n_0$=1, --, therefor.

In Column 5, Line 65, delete "is block" and insert -- is a block --, therefor.

In Column 5, Line 66, delete "apparatus" and insert -- apparatus. --, therefor.

In Column 6, Line 23, in Claim 1, after "P of", insert -- equi-spaced --.

In Column 6, Line 23, in Claim 1, after "for" delete "potential".

In Column 6, Line 27, in Claim 1, delete "to a set P" and insert -- to the set P of --, therefor.

In Column 6, Line 42, in Claim 4, delete "specific" and insert -- cell-specific --, therefor.

In Column 6, Line 44, in Claim 5, delete "specific" and insert -- cell-specific --, therefor.

In Column 6, Line 46, in Claim 5, delete "in the service are." and insert -- in a service area. --, therefor.

In Column 6, Line 52, in Claim 6, delete "indicating the number of" and insert -- indicating a number of equi-spaced --, therefor.

Signed and Sealed this
Twelfth Day of July, 2011

David J. Kappos
*Director of the United States Patent and Trademark Office*

CERTIFICATE OF CORRECTION (continued)
U.S. Pat. No. 7,881,260 B2

In Column 6, Lines 61-62, in Claim 6, delete "in its serial" and insert -- in serial --, therefor.

In Column 7, Line 8, in Claim 8, delete "in the service arc." and insert -- in a service area. --, therefor.

In Column 8, Line 6, in Claim 9, delete "electric" and insert -- electronic --, therefor.